United States Patent [19]
Gravitt

[11] 3,748,772
[45] July 31, 1973

[54] FISH LURE

[76] Inventor: Elmer W. Gravitt, 4237 N.W. 11th Ct., Des Moines, Iowa

[22] Filed: Sept. 13, 1971

[21] Appl. No.: 179,720

[52] U.S. Cl. .................................................. 43/41
[51] Int. Cl. ............................................ A01k 97/04
[58] Field of Search .................. 43/41, 41.2, 42.06, 43/44.99, 44.2, 44.6, 44.4

[56] References Cited
UNITED STATES PATENTS

| 2,302,206 | 11/1942 | Gibson et al. | 43/41 |
| 2,112,385 | 3/1938 | Smith | 43/41 |
| 2,944,362 | 7/1960 | Kreeger | 43/41 |
| 2,659,996 | 11/1953 | Hegler, Jr. | 43/44.6 |

Primary Examiner—Warner H. Camp
Attorney—Zarley, McKee & Thomte

[57] ABSTRACT

First and second transparent housing members are pivotally secured together at one end by a U-shaped element to form a hollow minnow compartment. The upper one of the housing members is provided with an air compartment and each of the members are formed with water passages. A fishhook is connected to the U-shaped pivot element and to the bottom one of the members. The end of the members opposite to the pivoted end are held by a snap fastener connected to a leader.

1 Claim, 5 Drawing Figures

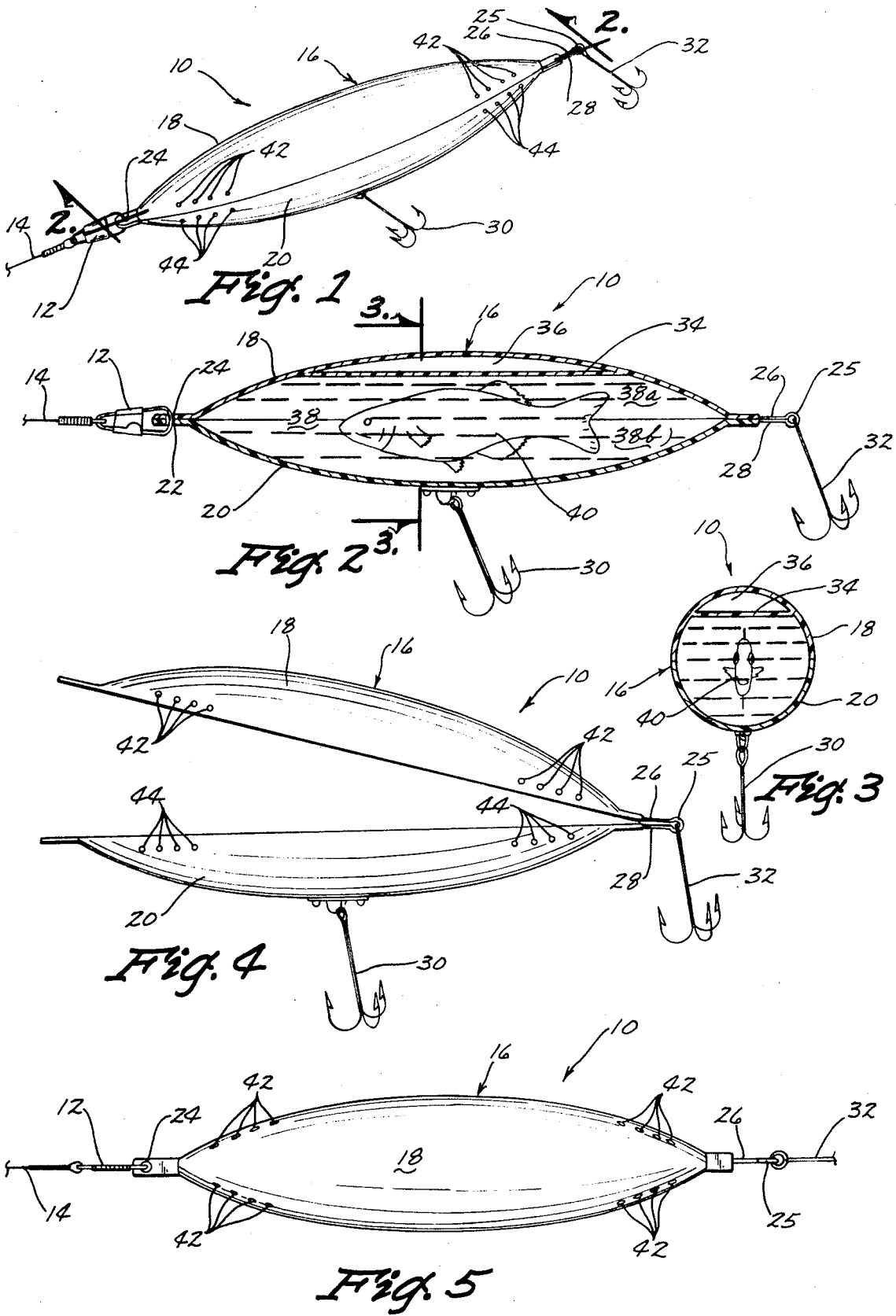

FISH LURE

Minnows have long been secured to hooks in an effort to catch fish striking at the minnow. The minnows which are impaled on the hooks quickly die and do not have much freedom of movement during the time that they are alive. Further, the minnows are usually only able to be used since the minnow will be severely damaged upon the fish striking the same. Additionally, the conventional lures employing minnows thereon frequently sink to the bottom of the fishing area and become entangled in the weeds therein.

Therefore, it is a principal object of this invention to provide an improved fish lure.

A further object of this invention is to provide a fish lure wherein a live minnow is enclosed in a minnow compartment thereby permitting the minnow to be re-used and permitting substantially unrestricted movement for the minnow.

A further object of this invention is to provide a fish lure comprising upper and lower transparent housing members which may be opened with respect to each other to facilitate the insertion of a minnow therein.

A further object of this invention is to provide a fish lure having an air compartment formed therein to provide buoyancy to the lure.

A further object of this invention is to provide a fish lure having means thereon for preserving the live condition of the minnow contained therein.

A further object of this invention is to provide a fish lure which is durable in use, realistic in appearance and economical of manufacture.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings in which:

FIG. 1 is a front perspective view of the lure of this invention attached to the leader snap:

FIG. 2 is a side view of the lure:

FIG. 3 is a sectional view seen along lines 3—3 of FIG. 2:

FIG. 4 is a side view illustrating the manner in which the top and lower housing members are secured together; and FIG. 5 is a top view of the assembled lure.

The fish lure of this invention is referred to generally by the reference numeral 10 with the reference numeral 12 referring to the snap usually found on a conventional leader 14. The leader 14 is connected to the fishing line at its other end. Lure 10 generally comprises a housing 16 including upper and lower housing members 18 and 20 respectively which are adapted to be positioned adjacent each other as illustrated in the drawings.

Housing member 20 is provided with an opening 22 at its forward end which is adapted to register with opening 24 formed in the forward end of housing member 18. A wire loop 25 is provided at the rearward end of the housing and has its ends 26 and 28 embedded in the rearward ends of the housing members 18 and 20 respectively to provide a flexible connection at the rearward end thereof.

Housing member 20 has a hook means 30 extending from its central bottom area and a hook means 32 is suspended from the wire loop 25 as illustrated in the drawings. Housing member 18 has a horizontally disposed wall 34 extending thereacross to provide a sealed air compartment 36 thereabove for buoyancy purposes.

As seen in the drawings, the housing members 18 and 20 have hollow interiors 38a and 38b to define a minnow compartment 38 when the lure is in the closed condition. The numeral 40 designates a live minnow which may be placed in the compartment 38. Housing members 18 and 20 are constructed from a hard transparent plastic material so that the minnow 40 will be visible to the fish and so that the lure will not break upon being struck by the teeth of the striking fish.

In use, the housing members 18 and 20 are first opened with respect to each other such as illustrated in FIG. 4 with the wire loop 25 permitting the opening of the same. The live minnor 40 is then placed in the compartment 38b and the housing members 18 and 20 being again closed. The snap 12 of the leader 14 is then extended through the openings 22 and 24 to maintain the housing members 18 and 20 together. The lure is then employed in the water in conventional fashion. The openings 42 in housing member 18 and the openings 44 in the housing member 20 permit water to enter the compartment 38 when the lure is placed in the water so as to preserve the live condition of the minnow 40. The air compartment 36 provides buoyancy to the lure so that the lure is prevented from moving downwardly into the weeds of the area being fished. The movement of the minnow 40 is substantially unrestricted as compared to when the minnow is on a hook. The moving minnow 40 is readily visible to the fish and is extremely realistic. The fish strikes at the minnow 40 and is hooked by either of the hook members 30 or 32. The construction of the lure insures that the housing will not be damaged by the teeth of the striking fish and permits the minnow to be "reused" time after time. The compartment 38 insures that the minnow will move in a realistic manner and insures that the minnow will not be damaged by the striking fish.

Thus it can be seen that the fish lure accomplishes at least all of its stated objectives.

1. A fish lure comprising,
   a transparent elongated housing having first and second members defining a minnow compartment therein,
   a U-shaped spring element at the rear end of said housing with one leg connected to one of said members and the other leg connected to the other member for yieldably maintaining said first and second housing members in an open position for providing access into said minnow compartment and said members moveable to a closed position against the action of said spring,
   a fish hook connected to the bight of said U-shaped spring,
   a pair of overlapping aligned apertured elements on the forward ends of said first and second members and a snap hook extending through said apertures for locking said first and second members in a closed position,
   a fish line connected to said snap hook,
   a sealed air compartment in said minnow compartment in the top member of said first and second members, to provide buoyancy to the lure, and
   said housing having a plurality of openings formed therein which communicate with said minnow compartment to permit water to flow into said minnow compartment to preserve the condition of the minnow.

* * * * *